United States Patent
Oguchi et al.

[11] Patent Number: 5,481,522
[45] Date of Patent: Jan. 2, 1996

[54] RECORDING/REPRODUCING METHOD AND APPARATUS USING PROBE

[75] Inventors: Takahiro Oguchi, Yamato; Kunihiro Sakai, Isehara, both of Japan

[73] Assignee: Canon Kabushiki Kaisha, Tokyo, Japan

[21] Appl. No.: 291,676

[22] Filed: Aug. 16, 1994

[30] Foreign Application Priority Data

Aug. 26, 1993 [JP] Japan .................. 5-211779

[51] Int. Cl.⁶ ......................................... G11B 7/00
[52] U.S. Cl. .................. 369/101; 369/126; 369/59; 365/118
[58] Field of Search ........................ 369/101, 126, 369/44.28, 44.34, 59; 365/118, 174

[56] References Cited

U.S. PATENT DOCUMENTS

| | | | |
|---|---|---|---|
| 4,133,047 | 1/1979 | Levinthal | 365/118 |
| 4,829,507 | 5/1989 | Kazan et al. | 369/126 |
| 4,831,614 | 5/1989 | Duerig et al. | 369/101 |
| 5,032,713 | 7/1991 | Eguchi et al. | 250/214.1 |
| 5,172,359 | 12/1992 | Sato | 369/59 |
| 5,251,200 | 10/1993 | Hatanaka et al. | 369/126 |
| 5,329,515 | 7/1994 | Kawagishi et al. | 369/126 |
| 5,353,271 | 10/1994 | Abe | 369/59 |

FOREIGN PATENT DOCUMENTS

| | | |
|---|---|---|
| 0325056 | 7/1989 | European Pat. Off. . |
| 0510579 | 10/1992 | European Pat. Off. . |
| 0513790 | 11/1992 | European Pat. Off. . |
| 0551964 | 7/1993 | European Pat. Off. . |
| 61-080536 | 4/1986 | Japan . |
| 62-281138 | 12/1987 | Japan . |
| 63-096756 | 4/1988 | Japan . |
| 63-161553 | 7/1988 | Japan . |
| 63-161522 | 7/1988 | Japan . |
| 01196751 | 8/1989 | Japan . |
| 2210633 | 8/1990 | Japan . |

OTHER PUBLICATIONS

Binning et al., "Surface Studies by Scanning Tunneling Microscopy," Physical Review Letters, vol. 49, No. 1, Jul. 5, 1992.

*Primary Examiner*—Loha Ben
*Attorney, Agent, or Firm*—Fitzpatrick, Cella, Harper & Scinto

[57] ABSTRACT

A recording and reproducing method writes information in the form of bits by the physical interaction between a probe and a recording medium opposed to the probe. The method includes a recording step of recording information by shifting a forming position of each bit by a predetermined shift amount in a horizontal direction of the recording medium in accordance with information, and a reproducing step of reproducing the information, based on the shift amount of each recorded bit in the horizontal direction of the recording medium. A recording and reproducing apparatus is so constructed as to perform the steps.

4 Claims, 9 Drawing Sheets

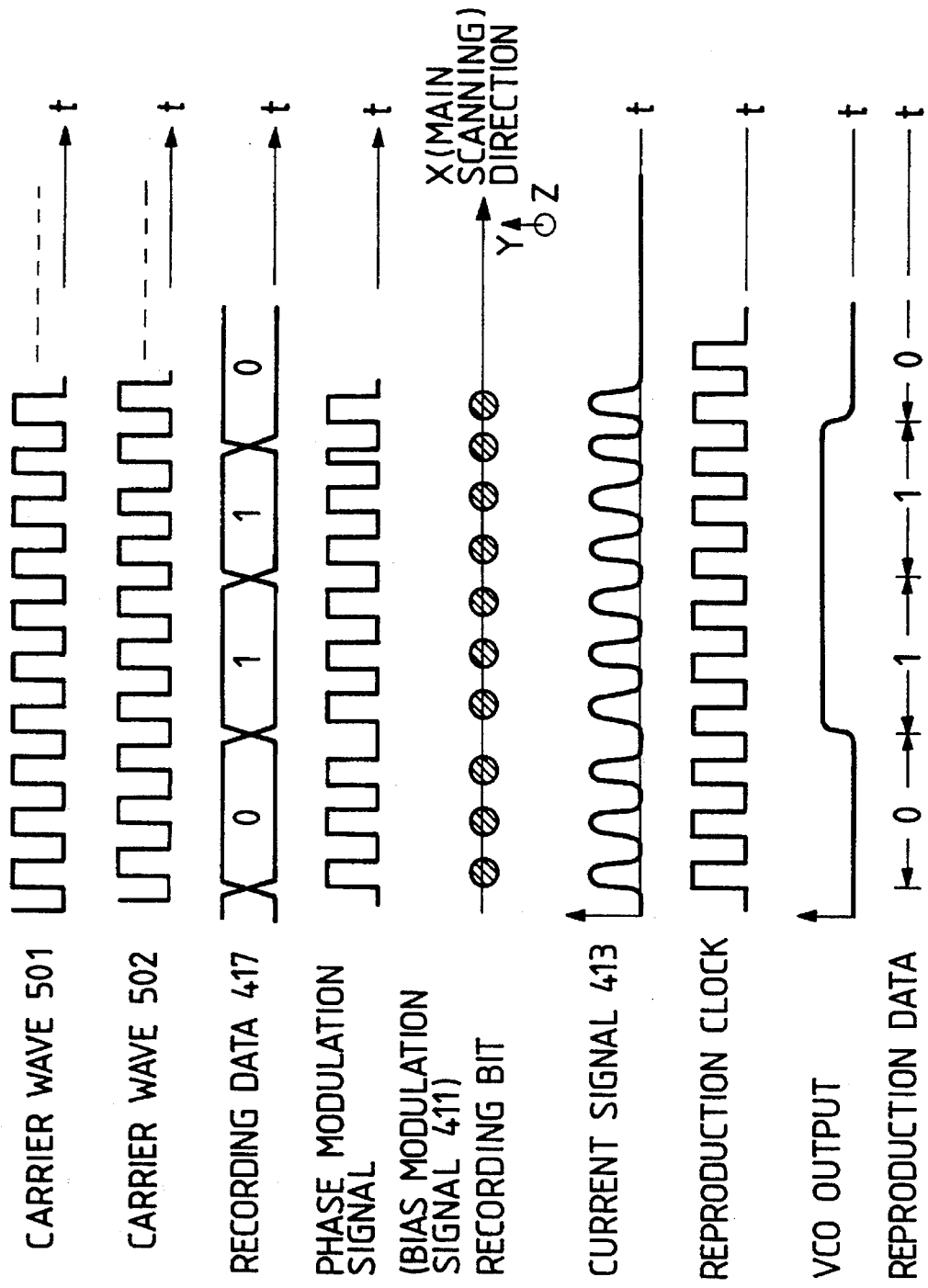

FIG. 7
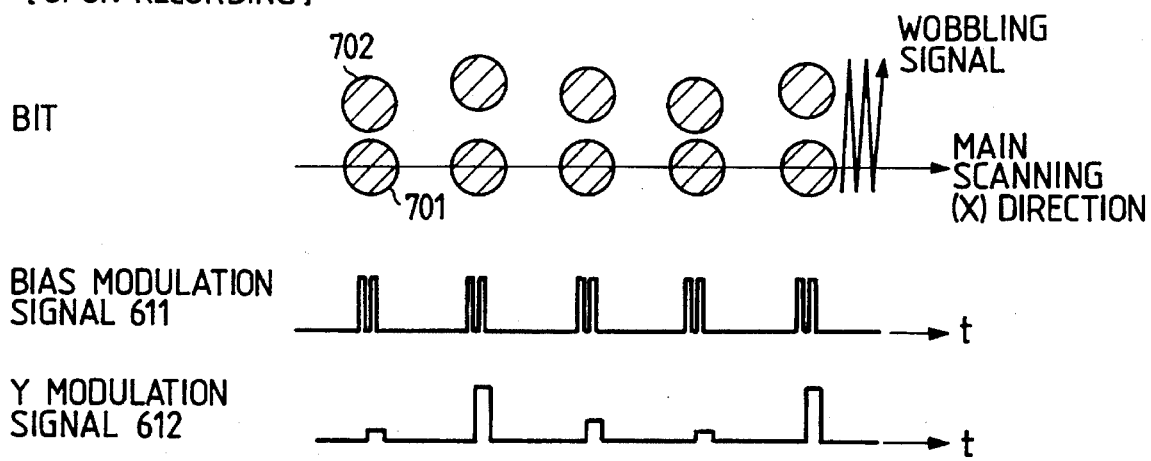
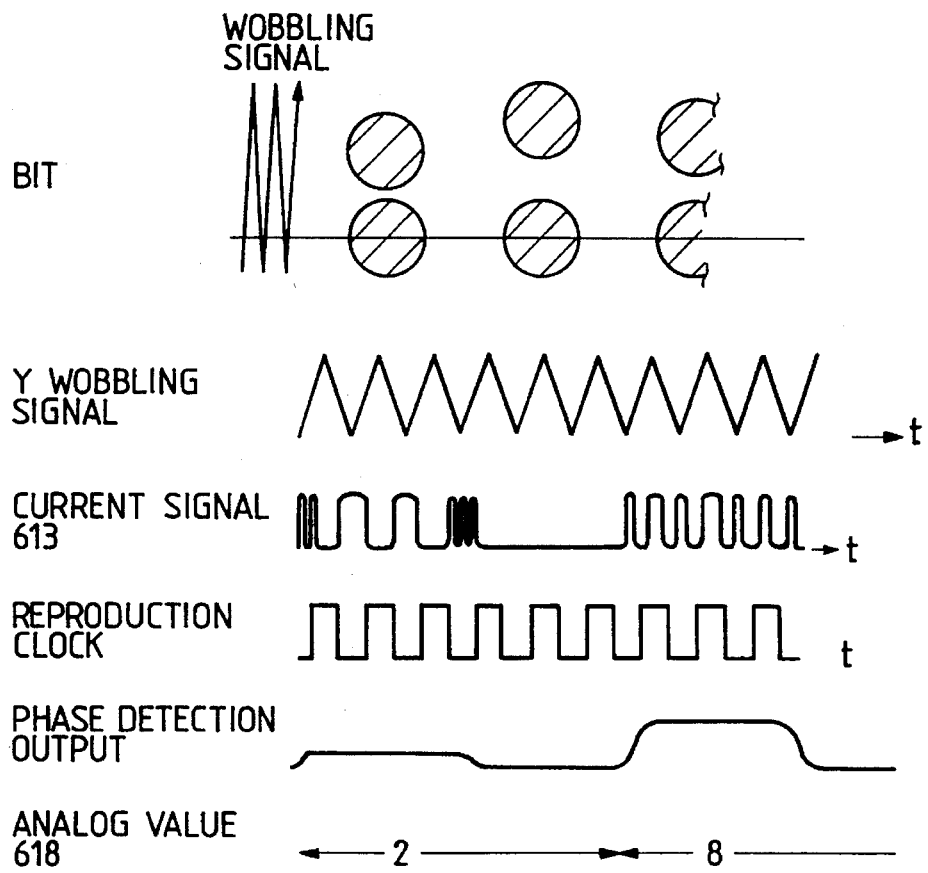

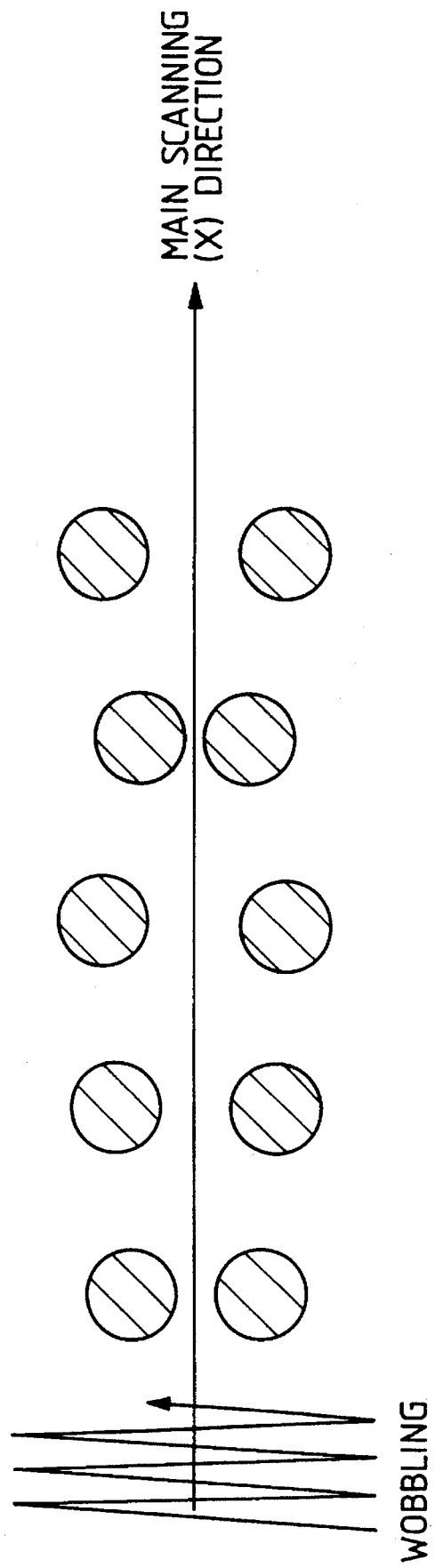

RECORDING/REPRODUCING METHOD AND APPARATUS USING PROBE

BACKGROUND OF THE INVENTION

1. Field of the Invention

The present invention relates to a recording and reproducing method and a recording and reproducing apparatus using a probe, for writing and reading information by physical interaction between the probe having a tip at its distal end and a recording medium opposed thereto.

2. Related Background Art

There is recently developed a scanning tunneling microscope (hereinafter referred to as STM) enabling to directly observe an electronic structure of surface atoms of a conductor, whereby high-resolution measurement of a real, spatial image became possible, whether for a single crystal material or for an amorphous material. [G. Binnig et al. Phys. Rev. Lett, 49, 57 (1982)]

The STM utilizes the fact that a tunnel current flows when a metal probe (tip) is brought close to a conductive material, for example up to a distance of about 1 nm, while applying a voltage between them. This current is very sensitive to a change of the distance between them. Scanning the surface with the probe so as to keep the tunnel current constant, even a variety of information concerning a total electron cloud in a real space can be read. For the measurement the resolution is about 0.1 nm in in-plane directions.

Accordingly, applying the principle of STM, high-density recording and reproduction can be readily effected in the atomic order (sub-nanometer order). For example, a recording and reproducing apparatus, as disclosed in Japanese Laid-open Patent Application No. 61-80536, is so arranged that atom particles adhered to a surface of a medium are removed with an electron beam to write data and the written data is reproduced by STM.

There are suggestions concerning a method which employs as a recording layer a material having memory effect for switching characteristics of voltage-current, for example a thin-film layer of a material selected from π-electron organic compounds and chalcogen compounds, to record and reproduce data with STM (Japanese Laid-open Patent Applications No. 63-161552 and No. 63-161553). This method permits large-capacity recording and reproduction, for example at the density of $10^{12}$ bit/cm$^2$ in case of the recording bit size being 10 nm. Further, some suggestions are directed to a reduction of the size, proposing apparatus in which a plurality of probes with respective tips are formed on a semiconductor substrate and a recording medium opposed thereto is displaced to record data (Japanese Laid-open Patent Applications No. 62-281138 and No. 1-196751). For example, if the above-described material having the memory effect is combined with a multi-probe head in which 2500 probes are arranged in a matrix of 50×50 on a 1-cm$^2$-square silicon chip, recording or reproduction of digital data can be made at recording capacity of 400 Mbit per probe or at total recording capacity of 1 Tbit.

In such recording and reproducing apparatus, signals are normally recorded in the form of bits on the surface of the recording medium and the recorded bits are detected in the form of a level change of the tunnel current (in case of STM) upon reproduction. For example, in case of binary signals being recorded, bits are arranged on the recording medium to effect recording with presence or absence of bit and the information is read out detecting the tunnel current change between the probe tip and the recording medium (Japanese Laid-open Patent Application No. 63-96756). Another suggestion concerns analog signal recording of the tunnel current according to an information-writing size, using a medium which selects a charge or a magnetic domain in the molecular size depending upon recording data, as a recording medium (Japanese Laid-open Patent Application No. 2-210633).

The following problems are, however, recognized in the above cases where the data is recorded with presence or absence of bit or with difference of signal level and the recorded data is reproduced by detecting the presence or absence of signal or the signal intensity difference from recorded bits.

(1) As described previously, STM or AFM (atomic force microscope) has high resolution of angstrom order in the vertical direction. Thus, if it was used to construct a recording and reproducing apparatus of nanometer order, the high resolution in the vertical direction caused a large change of detected signals even with noise components such as defects or fine vertical undulations on the recording medium. Then flatness and uniformity of atomic level was required for the recording medium to be used in recording and reproduction. It has been difficult to produce a recording medium satisfying this requirement over a wide area. Therefore, it has been desired to achieve a recording and reproducing method which could permit recording and reproduction at sufficient S/N ratio even with some disturbance of flatness of the recording medium. Such suggestions have been rare.

(2) In the case where the analog signal recording was carried out by changing a modulation amount of recorded information bits in accordance with writing information size, the shape of recorded bits relying on the recording information must be formed with good reproducibility and at accuracy of angstrom order. It has been, however, actually difficult to effect the analog recording while changing the shape of recorded bits accurately in the angstrom order on an analog basis.

(3) In the recording and reproducing method utilizing the principle of STM, servo operation is normally employed to keep signals of the tunnel current constant between the tip and the medium. In case of the binary recording, for example, original signals were not used without modulation for recording, but modulation was necessary for the recording signals not to have a dc signal component. This needed a modulation circuit of complex structure and a demodulation circuit for demodulating modulated data.

SUMMARY OF THE INVENTION

An object of the present invention is to provide a recording and reproducing method and a recording and reproducing apparatus using a probe, which can record and reproduce data at sufficient S/N ratio even with noise components and which can readily pick up horizontal and vertical position control signals between the probe and a recording medium without employing a modulation circuit or a demodulation circuit of complex structure.

The above object can be achieved by a recording and reproducing method for writing information in the form of bits by the physical interaction between a probe and a recording medium opposed to said probe, comprising:

a recording step of recording information by shifting a forming position of a bit by a predetermined shift amount in a horizontal direction of said recording medium in accordance with information; and a reproducing step of reproducing said information, based on the shift amount of said recorded bit in the horizontal direction of said recording medium.

Further, the above object can also be achieved by a recording and reproducing apparatus for writing information in the form of bits by the physical interaction between a probe and a recording medium opposed to said probe, comprising:

recording means for recording information by shifting a forming position of a bit by a predetermined shift amount in a horizontal direction of said recording medium in accordance with information; and reproducing means for reproducing said information, based on the shift amount of said recorded bit in the horizontal direction of said recording medium.

The present invention is directed to recording and reproduction in writing/reading information by the physical interaction between the probe and the recording medium opposed thereto, which is not the recording and reproduction of information utilizing the presence or absence of bit or the difference of size or height of bit, but is one where information is recorded as presence or absence of positional shift in serial bits or as a "shift amount" of each bit in a horizontal direction and the thus recorded bits are detected in reproduction. Generally, the STM has the resolution of sub-nanometer order in a horizontal direction. Therefore, among the recording and reproducing methods using an array of fine bits in the bit size of about 10 nm, the method to record and reproduce positional shifts of bits in a horizontal direction as in the present invention can detect signals with high S/N ratio and is unlikely to be affected by unflatness of the recording medium. Since the bits are approximately continuously recorded regardless of the contents of data to be recorded, the method of the invention has advantages that vertical/horizontal controls of the probe are easy in reproduction and that the bit arrangement is a recording/reproducing format suitable for recording and reproducing apparatus utilizing the principle of STM or AFM.

BRIEF DESCRIPTION OF THE DRAWINGS

FIG. 5B is a timing chart to illustrate a recording and reproducing method in embodiment 2;

FIG. 7 is a timing chart to show a layout of bits in embodiment 3; and

FIG. 8 is a timing chart to show another example of layout of bits in embodiment 3.

DESCRIPTION OF THE PREFERRED EMBODIMENTS

Embodiments of the present invention will be described with reference to the drawings.

Embodiment 1

Figure 1:
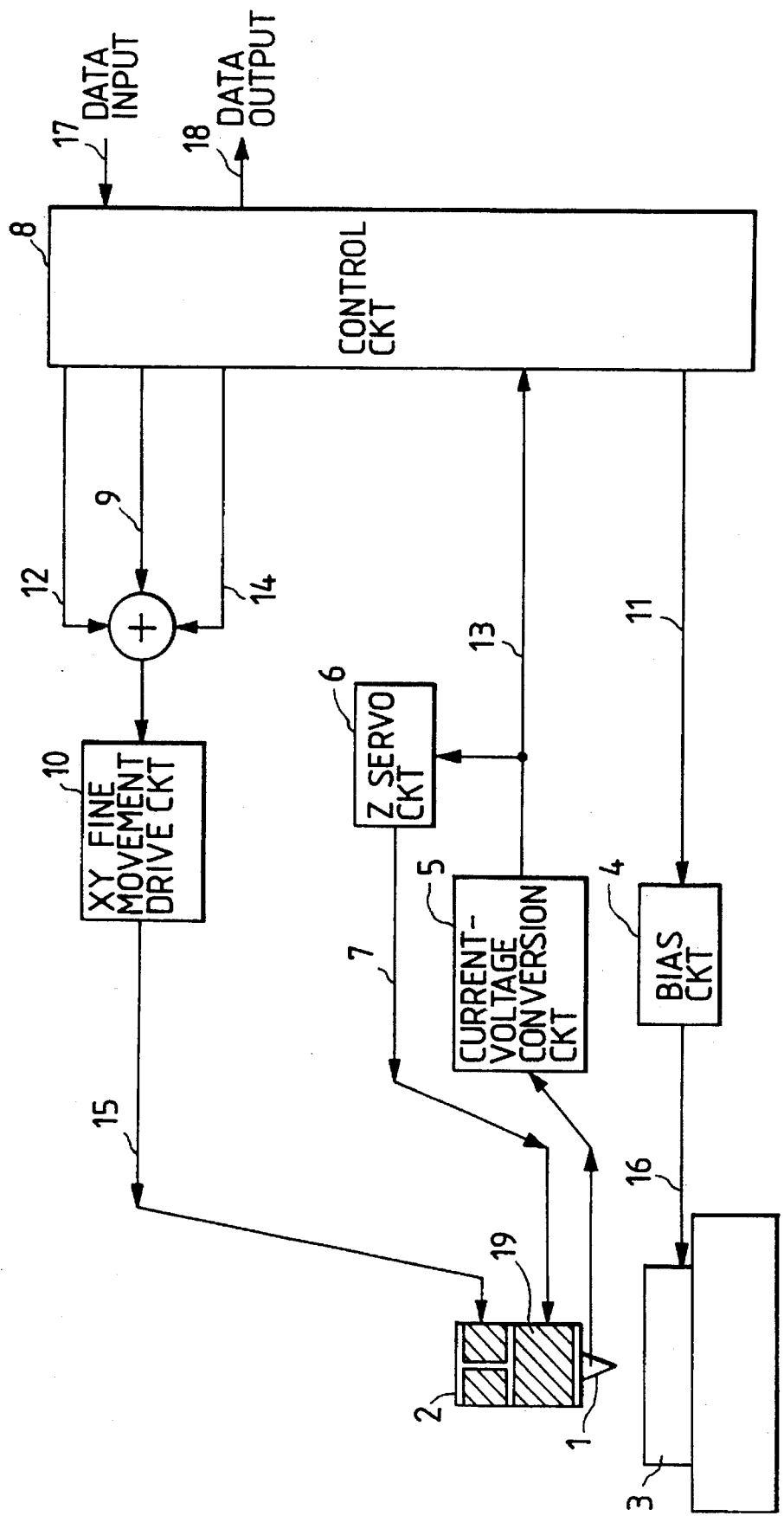
FIG. 1 is a drawing to show the structure of a recording and reproducing apparatus having a conductive probe and a recording/reproducing format in embodiment 1 of the present invention.

FIG. 1 is a drawing to show the structure of a recording and reproducing apparatus having a conductive probe and a recording/reproducing format in embodiment 1 of the present invention.

In FIG. 1, reference numeral 1 denotes a conductive probe, 2 a cylindrical piezoelectric device, which is a fine movement drive mechanism for driving the probe 1, and 3 a recording medium. The cylindrical piezoelectric device 2 is driven by a coarse movement drive mechanism such as a linear motor, not shown, to obtain an access to the recording medium 3. Numeral 10 designates an xy fine movement drive circuit to output an xy drive signal 15.

A bias circuit 4 normally applies a bias voltage 16 between the probe 1 and the recording medium 3, which are brought close to each other so that a tunnel current or field-emission current is ready to flow. The tunnel current or field-emission current is converted into a voltage signal by a current-voltage conversion circuit 5 and the voltage signal is supplied to a z-servo circuit 6. The z-servo circuit 6 outputs a distance control signal 7 to keep the tunnel current or field-emission current constant, and the distance control signal 7 is applied to an electrode 19 for driving the cylindrical piezoelectric device 2 in the z-direction. The probe 1 was formed by mechanically cutting platinum and making it pin-pointed.

The recording medium 3 was made of a material having the memory effect for switching characteristics of voltage-current. For example, used as a substrate electrode is an epitaxially grown surface of gold on a flat substrate such as glass or mica. Using squarilium-bis-6-octylazulene (hereinafter referred to as SOAZ) for the recording medium 3, a built-up film of double monomolecular layers thereof is formed on the substrate electrode by the Langmuir-Blodgett technique to produce the recording medium 3.

Recording of bits is carried out as follows. The bias circuit 4 normally applies the bias voltage 16 between the probe 1 and the recording medium 3, which are brought close to each other to the extent that the physical interaction takes place therebetween, specifically to the extent that a tunnel current flows herein. The probe 1 is moved to a desired position on the recording medium 3 in this state, and the bias voltage from the bias circuit 4 is modulated to apply a voltage exceeding a threshold voltage to cause the electric memory effect between the probe 1 and the recording medium 3, thus effecting recording. In fact, a bias voltage of about 0.1 V was applied through the bias circuit 4 between the probe 1 and the recording medium 3 and they were brought close to each other so that a constant tunnel current (1 pA) flowed. Keeping this state, the probe 1 was moved to a desired position on the recording medium 3. Then the control circuit 8 modulated the bias circuit 4 with bias modulation signal 11 to apply a pulse voltage of 6 V between the probe 1 and the recording medium 3. Then a bit was formed in the diameter of 10 nm so that a current of 10 to 100 pA could flow, and that state was kept after the application of pulse voltage. Then the bit in the low-resistance state was associated with "1" or "0", and bits were recorded as discriminating them from recording regions in a high-resistance state. In recording, the control circuit 8 generates a scanning signal 9 to drive the cylindrical piezoelectric device 2 through the xy fine movement drive circuit 10. As the probe 1 was two-dimensionally scanning the recording medium 3 in the xy raster scanning method, bits of "0" and "1" were recorded in the main scan (x) direction. After that, the recording medium 3 was scanned with the probe 1 to detect a shift amount of each bit from a reference bit position and the recorded information was reproduced as data of "0" and "1".

Figure 2:
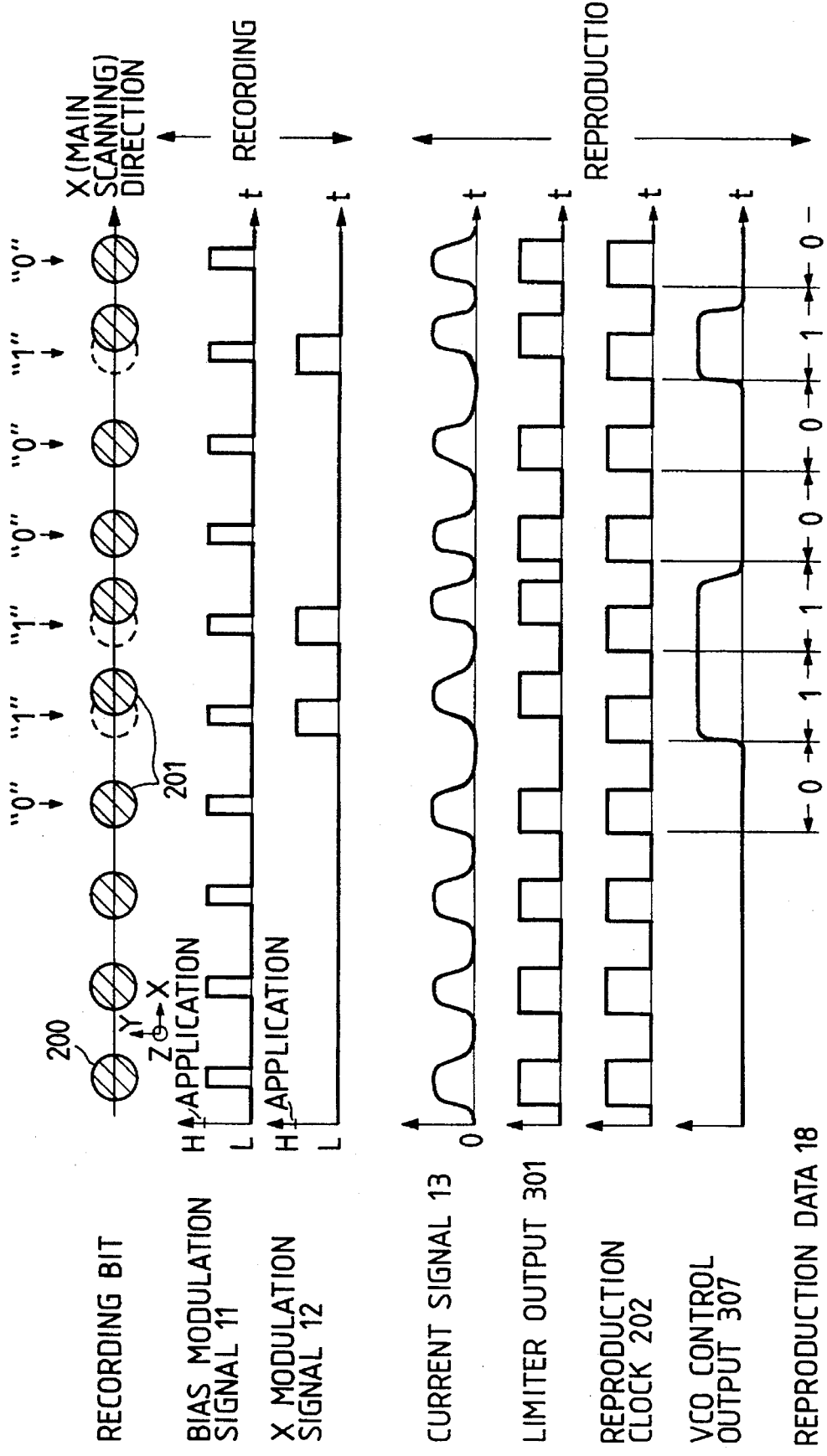
FIG. 2 is a timing chart to illustrate a recording and reproducing method in embodiment 1.

Specific recording and reproducing method and recording/reproducing format are next described referring to FIG. 1 and FIG. 2. FIG. 2 is a timing chart to illustrate a recording and reproducing method in embodiment 1. In recording, clock bits 200 necessary for recording and reproduction are recorded in the recording medium together with data bits 201 as a signal corresponding to a data input 17. A recording region of the recording medium 3 is divided into a head region where a clock signal is recorded and a data region where recording data is written. The clock bits 200 to be used in reproducing the recording data are recorded in the head region, from which the clock signal is taken out in reproduction. The recording data is recorded as binary data in the data region, in which bits corresponding to data of "0" and "1" are aligned as shown in FIG. 2. Namely, bits corresponding to information "0" are recorded at positions synchronized with the clock signal. On the other hand, bits corresponding to information "1" are recorded at positions phase-shifted in the main scan (x) direction from positions synchronized with the clock signal (FIG. 2).

Next described is the bit position shift recording in recording. Clock bits 200 and bits of information "0" were so recorded that, according to the timing from the control circuit 8, the bias modulation signal was generated when the probe passed a bit recording position, so as to apply the voltage to the recording medium. Since the bit diameter was about 10 nm, the clock bits and information "0" bits were formed at equal intervals of about 20 nm. For recording signals "1", the control circuit 8 generates an x-modulation signal 12 for modulating the cylindrical piezoelectric device 2 in the x-direction at the same time with the bias modulation signal 11. This shifts the position of the probe tip in the main scan (x) direction. When the bias circuit 4 generates the recording voltage in this state, a bit is recorded as phase-shifted in the main scan direction (x-direction) from the position synchronized with the clock signal. The cylindrical piezoelectric device 2 employed in the present embodiment is a PZT cylindrical piezoelectric device of 7 mm in outer diameter, 5 mm in inner diameter, and 15 mm in height. This piezoelectric device has divided drive electrodes, so that it can be three-dimensionally driven. Displacement characteristics of the PZT cylindrical piezoelectric device were measured using an electrostatic capacity displacement meter. Displacement sensitivity was 10 nm/V in the x- and y-directions. Thus, the control circuit 8 generated the modulation signal of 1 V as the xy modulation signal 12, so that in recording a recording signal "1" a bit was formed while shifting the probe by 10 nm in the main scan direction.

The shift amount of bit position was determined as follows. Bits are aligned at equal intervals as check bits on the recording medium 3. The bits are recorded at somewhat shifted positions depending upon the shape of the probe tip. The bit array is scanned after recorded, to check horizontal variations of bit-recorded positions. The shift amount is so determined that a recorded bit is shifted by an amount greater than the amounts of variations of bit positions in recording. The present embodiment is so arranged that the probe position is to be shifted by 10 nm in the main scan direction in recording a recording signal "1", because the positional variations of recording bits were not more than about 1 nm.

For reproducing the thus recorded bits, the current signal 13 was compared in phase with the reference of reproduction reference clock 202 stabilized based on the clock bit output from the head record region. Namely, the recording signal is "0", when the phase of clock output is the same as that of the current signal (i.e., when a phase difference is "0" between them). On the other hand, the recorded signal is "1", when the phase of clock output is shifted relative to that of the signal. A data output 18 was obtained while reproducing the data by phase comparison between the clock output and the current signal as described.

Figure 3:
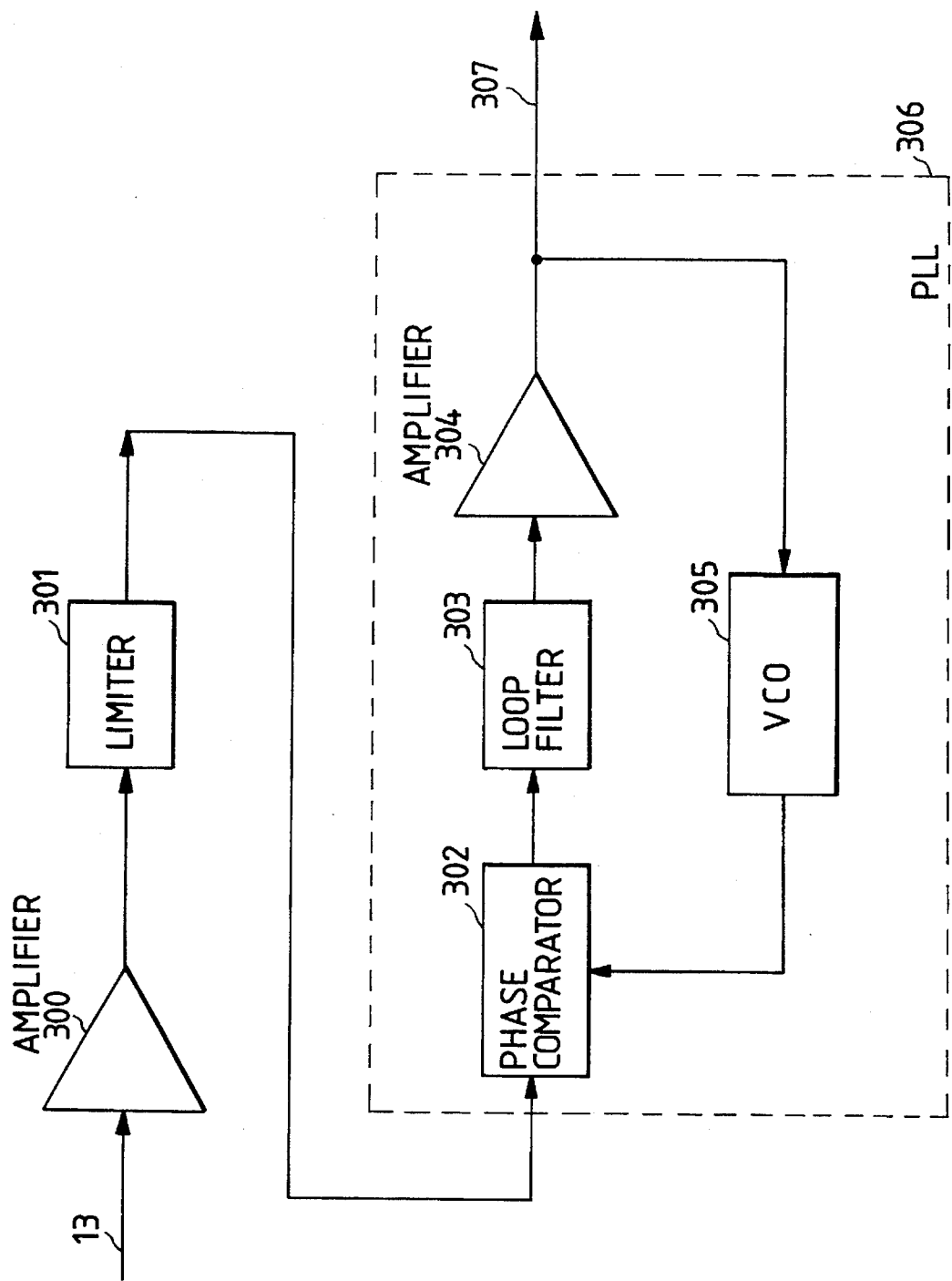
FIG. 3 is a drawing to show a signal reproducing circuit employed in FIG. 1.

FIG. 3 is a drawing to show a signal reproducing circuit used in FIG. 1. The reproducing circuit is arranged as a part of the control circuit 8. In FIG. 3, the current signal 13 was put into a phase-locked loop (PLL 306) to reproduce the signal. In detail, the PLL 306 is composed of a phase comparator 302, a loop filter 303, an amplifier 304, and a VCO (voltage controlled oscillator) 305. In reproduction, the phase information of the current signal becomes significant. Thus, the current signal output 13 is amplified by the amplifier 300 and the amplified signal is subjected to amplitude limitation in limiter 301 to obtain a signal with constant amplitude. An output from the limiter 301 is put into the PLL 306. The PLL 306 performs phase comparison between the output from the limiter 301 and an output from VCO 305. The PLL 306 changes a control voltage from VCO 305 so that the two inputs have a minimum phase difference when a frequency of one becomes coincident with that of the other. Then VCO control voltage 307 for follow-up becomes a reproduction signal. Namely, the control voltage for follow-up is detected as a change of voltage value to produce a phase shift 90° because of the difference between the bits "0" and "1". It is binarized to obtain reproduction data 18 (FIG. 2).

In reproduction the control circuit 8 also performs a control of y-directional position in such a manner that while the probe is slowly modulated in the sub-scan direction (y-direction), a current detected from the recording bits on this occasion is shifted to synchronous detection. This position control signal is a tracking signal 14. In the present embodiment the recording bits are recorded as position-modulated only in the main scan direction, whereby bits appear approximately continuously. It was confirmed that, regardless of the contents of recorded data, the tracking signal 14 was continuously taken out and the position of probe 1 could be controlled easily.

There are cases where the clock bit output from the head record region cannot be obtained in a stable manner. It can be considered that it is, for example, because the probe tip was deformed so as to increase variations of bit-recorded positions whereby the array of clock bits zigzagged in recording. This would lower the S/N in recording and reproduction. In that case, the tip of probe should be cleaned to achieve reproducibility of bit-recorded positions, and then the recording and reproduction should be performed.

The recording method according to the present invention is by no means limited to the two-dimensional xy raster scan of the probe 1 on the recording medium 3 as shown in the present embodiment. For example, the probe may be moved in a circumferential or spiral pattern to record and reproduce bits as shifted in the circumferential track direction.

Although the present embodiment showed the recording and reproducing apparatus utilizing the STM, the concept of the present invention is by no means limited to it. The present invention can be applied to other recording and reproducing apparatus utilizing the AFM, which can record concave or convex portion or change of electron state of a recording medium surface with the probe in the nanometer order.

Embodiment 2

Figure 4:
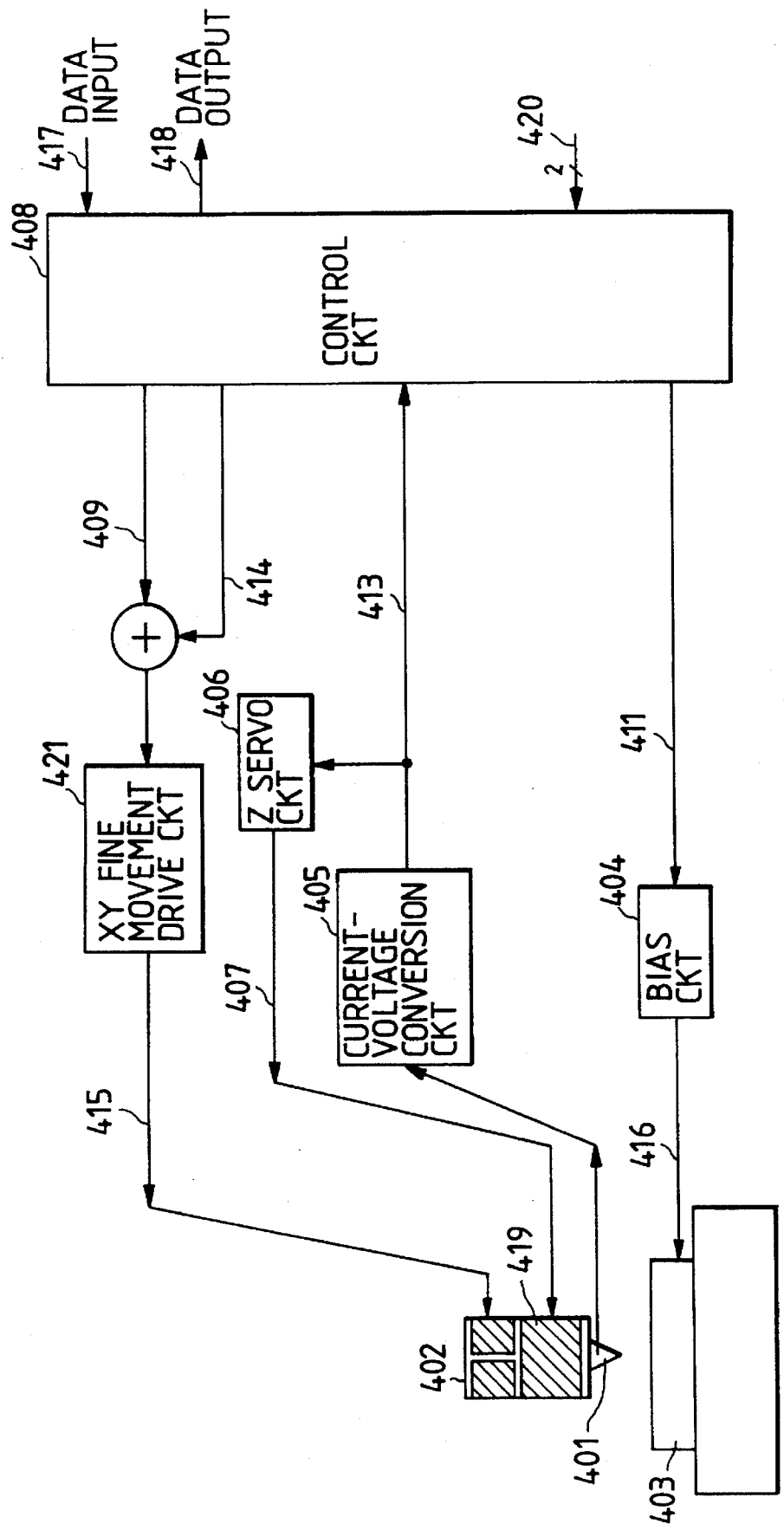
FIG. 4 is a drawing to show the structure of a recording and reproducing apparatus having a conductive probe and a recording/reproducing format in embodiment 2 of the present invention.

FIG. 4 is a drawing to show the structure of a recording and reproducing apparatus having a conductive probe and a recording/reproducing format in embodiment 2 of the present invention. The total structure well resembles that of embodiment 1 in FIG. 1. In FIG. 4, reference numeral 401 denotes a conductive probe, 402 a cylindrical piezoelectric device, which is a fine movement drive mechanism for driving the probe 401, and 403 a recording medium. The cylindrical piezoelectric device 402 is driven by a coarse movement drive mechanism such as a linear motor, not shown, to obtain an access to the recording medium 403. Numeral 408 designates a control circuit for outputting a scanning signal 409 and a tracking signal 414, and 421 an xy fine movement drive circuit for outputting an xy drive signal 415.

A bias circuit 404 normally applies a bias voltage 416 between the probe 401 and the recording medium 403 while the probe 401 and the recording medium 403 are brought close to each other to the extent that a tunnel current or field-emission current flows. The tunnel current or field-emission current is converted into a voltage signal by a current-voltage conversion circuit 405 and the voltage signal is supplied to a z-servo circuit 406. The z-servo circuit 406 outputs a distance control signal 407 so as to keep the tunnel current or field-emission current constant. The distance control signal 407 is applied to an electrode 419 for driving the cylindrical piezoelectric device 402 in the z-direction. The probe 401 was produced by mechanically cutting platinum and making it pin-pointed.

For the recording medium 403, a material employed was one having the memory effect for the switching characteristics of voltage-current, similarly as in embodiment 1.

Figure 5A:
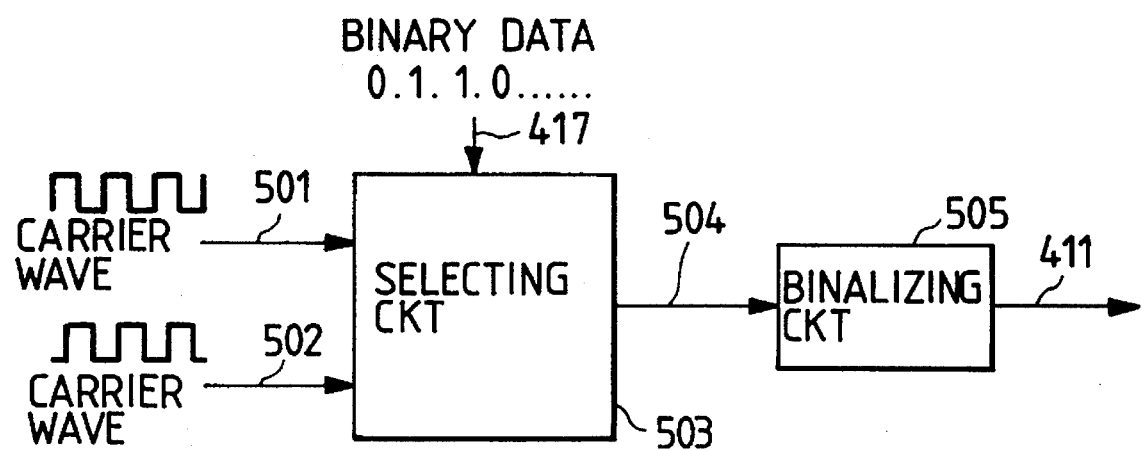
FIG. 5A is a drawing to show a phase modulation circuit 503 to perform phase modulation with binary information in a control circuit 408 in FIG. 4.

Embodiment 1 was so arranged that in recording binary bits the recording was carried out as shifting the probe in the main scan (x) direction with the xy drive signal from the xy fine movement drive circuit 10, while the present embodiment is so arranged that recording is made as shifting the bit position in the main scan direction by controlling application timing of recording voltage from the bias circuit 404. A specific recording method of the present embodiment will be described referring to FIGS. 5A and 5B. FIG. 5A is a drawing to show a phase modulation circuit 503 for performing phase modulation with binary information in the control circuit 408 of FIG. 4, and FIG. 5B a timing chart to illustrate the recording and reproducing method in embodiment 2. Two phase-shifted carrier waves (carrier wave 420 in FIG. 4) are prepared and binary data "0" and "1" is converted into phase information of the respective carrier waves. In FIGS. 5A and 5B, the two carrier waves 501, 502 may be expressed as follows.

$y = A \cdot \sin\omega t$: carrier wave 501

$y = A \cdot \sin(\omega t - \pi/2)$: carrier wave 502

The carrier waves 501, 502 prepared are shifted 90° in phase to each other. The frequency of carrier waves 501, 502 is determined by a maximum space frequency at which bits can be recorded on the recording medium, and the scanning speed of the probe tip. For example, if the size of bits is 10 nm, the recording pitch is 20 nm, and the scanning speed of the probe is 200 μm/sec, then the frequency of carrier waves 501, 502 is set as 10 kHz. The selection circuit 503 changes over to select the carrier wave 501 or the carrier wave 502 with "0" or "1", respectively, of data input 417 as the binary recording data. The timing control of the bias circuit 404 is carried out based on a phase modulation signal 504 output from the selecting circuit 503. Namely, the phase modulation signal 504 is put, for example, into a binarizing circuit 505 to produce a bias modulation signal 411, which is a timing signal to generate a recording voltage. Recording was effected by modulating the bias voltage 416 with the bias modulation signal 411.

The reproducing circuit is the same as that in FIG. 3. Namely, a PLL is constructed of a phase comparator, a loop filter, an amplifier, and a VCO (voltage controlled oscillator). Phase information of reproduction signal becomes significant. Thus, an output of current signal 413 is amplified and the amplified signal is amplitude-limited in a limiter so as to have a constant amplitude. An output from the limiter is put into the PLL. The PLL performs phase comparison between the limiter output and an output from VCO and changes the output from VCO so as to make a phase difference between them minimum when the frequency of one is coincident with that of the other. In this case, a demodulated signal is a control voltage for phase follow-up. The VCO control voltage for follow-up appears as a change of a voltage amount to cause a phase shift of 90° with a bit difference between "0" and "1". Then, the binary data is reproduced by binarizing the control voltage signal to obtain a data output 418.

Although the present embodiment was so arranged that the binary data was modulated with two carrier waves different in phase to record bits, the binary data may be modulated with two different frequencies to record bits.

Embodiment 3

Figure 6:
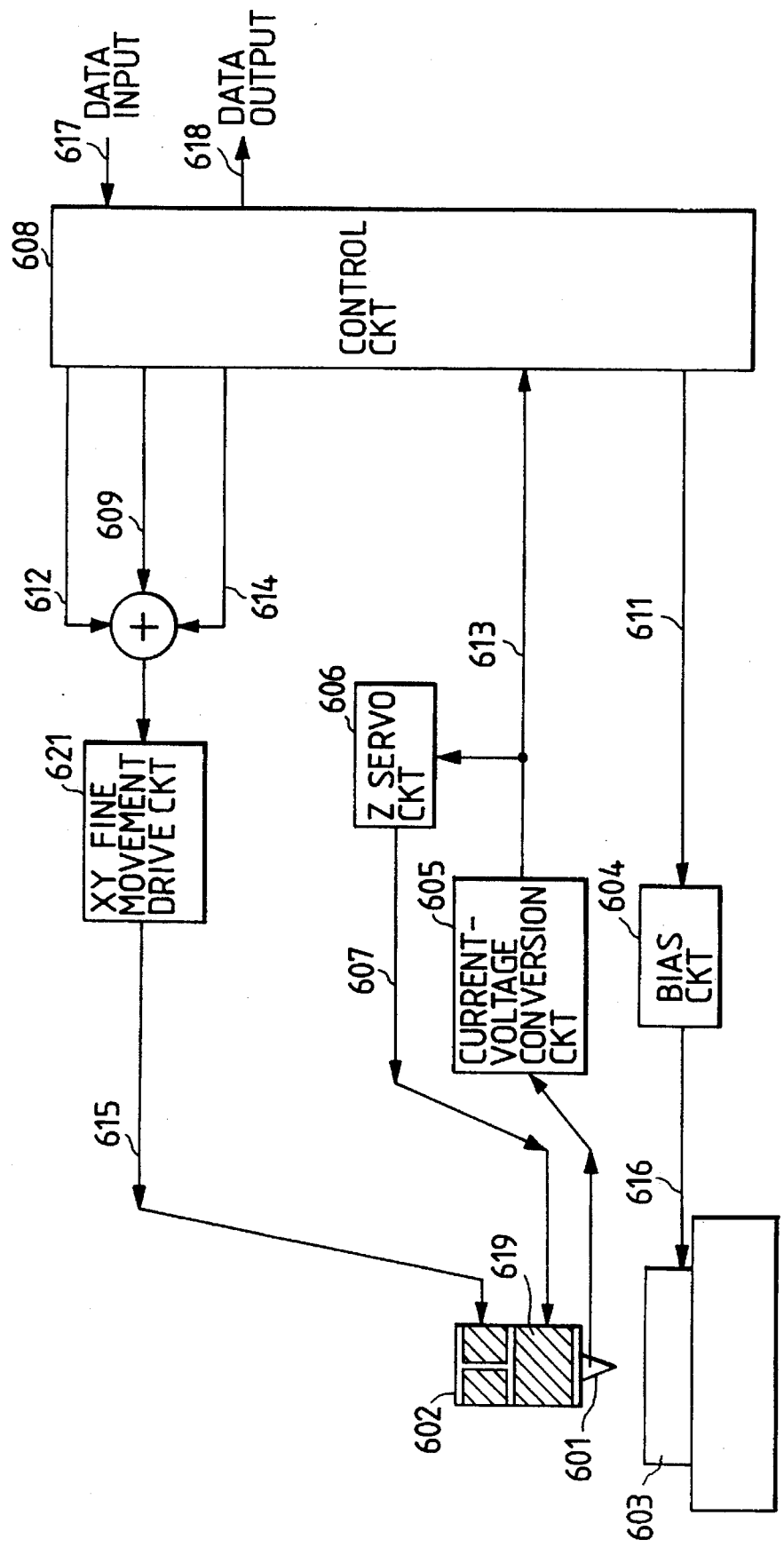
FIG. 6 is a drawing to show the structure of a recording and reproducing apparatus having a conductive probe and a recording/reproducing format in embodiment 3 of the present invention.

FIG. 6 is a drawing to show the structure of a recording and reproducing apparatus having a conductive probe and a recording/reproducing format in embodiment 3 of the present invention. The entire structure well resembles that of embodiment 1 in FIG. 1. In FIG. 6, reference numeral 601 denotes a conductive probe, 602 a cylindrical piezoelectric device, which is a fine movement drive mechanism for driving the probe 601, and 603 a recording medium. The cylindrical piezoelectric device 602 is driven by a coarse movement drive mechanism such as a linear motor, not shown, to obtain an access to the recording medium 603. Numeral 621 is an xy fine movement drive circuit for outputting an xy drive signal 615.

A bias circuit 604 normally applies a bias voltage 616 between the probe 601 and the recording medium 603 while the probe 601 and the recording medium 603 are brought close to each other to the extent that a tunnel current or field-emission current flows. The tunnel current or field-emission current is converted into a voltage signal by a current-voltage conversion circuit 605 and the voltage signal is supplied to a z-servo circuit 606. The z-servo circuit 606 outputs a distance control signal 607 so as to keep the tunnel current or field-emission current constant. The distance control signal 607 is applied to an electrode 619 for driving the cylindrical piezoelectric device 602 in the z-direction. The probe 601 was produced by mechanically cutting platinum and making it pin-pointed. The bias voltage 616 is modulated with a bias modulation signal 611.

For the recording medium 603, a material employed was one having the memory effect for the switching characteristics of voltage-current, similarly as in embodiment 1.

Embodiment 1 was so arranged that in recording, bits were recorded as shifting the probe in the main scan (x) direction with the xy drive signal from the xy fine movement drive circuit 10, while the present embodiment is so arranged that analog recording of data input 617 is carried out as shifting the probe in a direction (y-direction) perpendicular to the main scan and that an amount of the shift is detected as an analog value to perform analog reproduction as data output 618.

Next described is the bit-position-shifting recording in which positions of bits are shifted in recording. FIG. 7 is a timing chart to show a layout of bits in embodiment 3. Bits include clock bits 701 continuously aligned and information bits 702, each having an amount of positional shift in the sub-scan (y) direction from the clock bits 701, as analog recording information.

The control circuit 608 modulates the bias circuit 604 to record the clock bits 701 at equal intervals while moving the probe in the main scan (x) direction. After completion of recording of the clock bits, the control circuit records bits while shifting the probe in the y-direction in accordance with an amount of analog signal to be recorded.

In fact, because the bit size was about 10 nm, the clock bits 701 were formed at equal intervals of about 20 nm. On the other hand, for recording the information bits the control circuit generated the y-modulation signal 612 for modulating the xy fine movement drive unit, whereby bits were recorded as the probe tip was shifted in the sub-scan (y) direction.

The cylindrical piezoelectric device employed in the present invention is also a PZT cylindrical piezoelectric device, which is the same as that in embodiment 1. Since this piezoelectric device had the displacement sensitivity of 10 nm/V in the x and y directions, the modulation circuit generated a voltage of at most 2 V depending upon an analog amplitude amount of recording signal, so that the positional shift of at most 20 nm appeared in the sub-scan (y) direction. Recording was carried out by performing the main scan while forming bits shifted in the sub-scan direction from the positions of the clock bits, as described.

Next described is a method for reproducing the thus recorded bits. In reproduction, the control circuit produces a scanning signal 609 to perform the main scan (x-directional scan) while oscillating (wobbling) the probe within the width of about 30 nm in the sub-scan (y) direction, thus reproducing information.

On this occasion, a reproduction clock is produced based on the signal from the clock bits. A position control (tracking) signal 614 in the y-direction is generated by phase comparison between the reproduction clock and the wobbling signal, so as to perform a horizontal position control thereby. In a tracking state the probe 601 performs the main scan (in the x-direction) along the clock bit array. In this state the current signal 613 is subjected to phase detection with the reproduction clock signal, and a wave detector provides, as a phase difference signal, a signal according to a positional shift amount of each recording bit from the clock bit. This is reproduced as an analog data output 618.

The bit layout in the bit-position-shift recording is not limited to that shown in FIG. 7, but may be one as shown in FIG. 8. In the layout of FIG. 8, two paired bits are recorded in the sub-scan (y) direction while moving the probe in the main scan (x) direction. In this case, the recording is done while a distance between two bits in each bit pair is changed in an analog manner. For example, if the bit diameter is 10 nm, bits are to be recorded at the pitch of 20 nm in the main scan direction. As an example, bits were recorded as changing the bit distance within at most 20 nm according to values of analog data. In reproduction, the main scan was carried out while wobbling the probe in the width of 40 nm in the sub-scan direction to detect signals from the recorded bits. Since the bits were formed at the pitch of 20 nm in the main scan direction, the thus detected signals were demodulated using the clock determined by the pitch and the probe scanning speed so as to reproduce the data.

What is claimed is:

1. A recording and reproducing method for writing information in the form of bits by physical interaction between a probe and a recording medium opposed to said probe, comprising:

a recording step of recording information by shifting a forming position of a bit by a predetermined shift amount in a horizontal direction of said recording medium in accordance with information; and a reproducing step of reproducing said information, based on the shift amount of said recorded bit in the horizontal direction of said recording medium.

2. A recording and reproducing method according to claim 1, further comprising:

a step of relatively moving said probe to said recording medium so that said probe scans said recording medium in a predetermined direction, wherein said bit is shifted in said predetermined direction.

3. A recording and reproducing method according to claim 1, wherein said recording step is so arranged that in recording bits, a reference bit as a reference in reproduction and a data bit corresponding to information are simultaneously recorded and that a forming position of said data bit relative to said reference bit is shifted while changing a shift amount of said data bit in the horizontal direction of said recording medium in accordance with said information.

4. A recording and reproducing apparatus for writing information in the form of bits by physical interaction between a probe and a recording medium opposed to said probe, comprising:

recording means for recording information by shifting a forming position of a bit by a predetermined shift amount in a horizontal direction of said recording medium in accordance with information; and reproducing means for reproducing said information, based on the shift amount of said recorded bit in the horizontal direction of said recording medium.

* * * * *

UNITED STATES PATENT AND TRADEMARK OFFICE
CERTIFICATE OF CORRECTION

PATENT NO. : 5,481,522
DATED : January 2, 1996
INVENTOR(S) : Takahiro Oguchi, et al It is certified that error appears in the above-indentified patent and that said Letters Patent is hereby corrected as shown below:

On the title page item:

[56] REFERENCES CITED

Foreign Patent Documents, "01196751 8/1989 Japan
2210633 8/1990 Japan"
should read --1-196751 8/1989 Japan;
2-210633 8/1990 Japan--.

In the Drawings:

Sheet 5 of 9

FIG. 5A, "BINALIZING" should read --BINARIZING--.

COLUMN 8

Line 39, "iS" should read --is--.

Signed and Sealed this

Thirtieth Day of April, 1996

Attest:

BRUCE LEHMAN

*Attesting Officer*     *Commissioner of Patents and Trademarks*